2,710,861
Patented June 14, 1955

2,710,861

TREATMENT OF CELLULOSE WITH THE REACTION PRODUCT OF PRIMARY ALIPHATIC AMINES AND ETHYLENE OXIDE

Frank R. Charles and Julian A. Dixon, Hawkesbury, Ontario, Canada, assignors to Canadian International Paper Company, Montreal, Quebec, Canada, a corporation of Quebec, Canada No Drawing. Application August 20, 1951,
Serial No. 242,799

4 Claims. (Cl. 260—212)

This invention relates to new and useful improvements in the manufacture of cellulose, and especially cellulose suitable for conversion into viscose rayon, cellophane, sausage casings, cellulose derivatives such as nitrocellulose, cellulose acetate and the like, and other cellulosic products. Particularly, this invention relates to the manufacture of cellulose from wood or woody materials and has many advantages over previous wood pulps when employed to make viscose rayon. The process disclosed herein is also applicable to the processing of cotton which is to be used for similar purposes.

In the manufacture of the highest quality wood cellulose, wood is debraked and chipped, and the wood is treated at elevated temperatures and pressures with solutions of chemicals. Such chemicals are either bisulphites, usually of calcium, magnesium or ammonium and containing an excess of free $SO_2$ in solution, or are alkaline solutions of sodium hydroxide, sodium sulphide, sodium carbonate, or mixtures of these. At the conclusion of this treatment the softened chips are disintegrated into wood pulp. Such wood pulp contains small but significant proportions of lignin, tannins and other coloring matter, and organic solvent-extractable materials such as fats, fatty acids, resinous acids, sterols and hydrocarbons. The organic solvent-extractable materials are collectively termed "resin." The wood pulp produced as described above, which is mainly cellulose, is purified and bleached by one of several known processes for reaching commercially acceptable levels of purity of the cellulose. As the art of purifying cellulose has improved, resulting in nearly pure cellulose with a very small content of non-cellulosic constituents, many advantages have accrued, particularly in the properties of the rayon or other derivatives manufactured from such purified cellulose. Examples of such properties are color and strength. At the same time certain difficulties have arisen in the processing of such cellulose. For example, the lowering of the resin content of rayon-grade cellulose has given rise to difficult filtration of the viscose made from it.

Simultaneously, conditions in the rayon-making industry have changed, particularly in the direction of higher speeds in various processing steps, requiring cellulose which will process more rapidly.

We have discovered that these difficulties can be overcome and a superior pulp for processing can be made by adding to the cellulose at a late stage in its manufacture one or more of the group of products obtained by the condensation of aliphatic primary amines with ethylene oxide. Such compounds have the generic formula

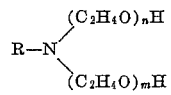

where R represents mixed alkyl groups and the sum of $n+m=10$ to 100.

Such primary amines are readily obtainable by suitable treatment of animal fats such as tallow. Armeen T and Armeen TD are good commercially available examples of such primary aliphatic amines. The primary amines obtained from animal fats are usually a mixture of several aliphatic amines containing for instance hexadecylamine ($C_{16}$), octadecylamine ($C_{18}$), octadecenyl amine ($C_{18}$, one double bond), octadecadienyl amine ($C_{18}$, two double bonds), etc. One mol of the aliphatic amine is condensed with from 10 to 100 mols of ethylene oxide to obtain a final product for use in this invention.

As far as we know condensation products made from ethylene oxide and the primary amines from animal fats are new, and this invention is believed to represent the first use of such products for improving the manufacture of cellulose derivatives.

These chemicals show remarkable stability in the viscose process, being stable under both the alkaline conditions of viscose preparation and the acid conditions of the spinning bath.

Benefits will be conferred by practically any number of ethylene oxide units in the polyoxyethylene portion of these amine condensation products, but best results are obtained with 10 to 100 ethylene oxide units.

We have found that small quantities of these products added to the cellulose confer very marked benefits. Among advantages found in the manfacture of viscose rayon is improved shredding of the alkali-cellulose, less power being required to shred the sheets to the same degree of comminution. The xanthation reaction is more uniform, with an apparent possibility of economy in carbon disulphide requirements, and there is a substantial reduction in the unreacted fibre content of the viscose and therefore much improved filtration of the viscose. Spinning is improved, spinneret incrustation reduced, and rayon strength and resistance to degradation by heating are improved. The resistance to degradation by heating mentioned here and in the examples is the percent strength as expressed by the silk factor (grams/denier × percent elongation) retained by the bleached rayon on heating the rayon at 105° C. for 16 hours with subsequent reconditioning to normal moisture content before retesting.

Cellulose manufactured according to this invention also has special advantage in the manufacture of dull yarn made with suspensions of pigments and oils in the viscose since the suspensions are much more fine grained and stable and the spinning proceeds with many fewer interruptions due to plugging or constriction of spinneret holes.

These products can be added easily to the cellulose. One way is to apply them in dilute aqueous solution to the cellulose at an early stage in the drying of the pulp sheet, in such a way that the added water is evaporated during the further drying of the sheet. An aqueous solution may be sprayed on the cellulose sheet or it may be applied by means of rolls. Narrow stripes may be applied by means of discs as it has been found that sufficient dispersion occurs in the shredding stage.

In accomplishing the objects of this invention it is not necessary to use more than 0.2% on the weight of cellulose and usually 0.01% to 0.1% is sufficient.

The following examples will illustrate preferred embodiments of this invention, but the invention must not be construed as limited to these examples:

Example I

A 10% aqueous solution of a product obtained by reacting a mixture of primary amines obtained from distilled tallow oil containing approximately 30% hexadecyl amine, 25% octadecyl amine, and 45% octadecenyl amine, with 15 mols of ethylene oxide, was sprayed across a sheet of cellulose passing through a pulp drying machine at such a rate that 0.2% was added based on weight of bone-dry cellulose. The sheet was dried to the normal moisture content (7%).

The cellulose treated in this fashion exhibited the following improvements in processing into 150 denier/80 filament viscose rayon textile yarn, spinning at 100 metres/minute:

| | Treated Wood Pulp | Untreated Wood Pulp |
|---|---|---|
| Shredding of alkali-cellulose: | | |
| Percent retained on ¼" mesh screen after 1½ hours shredding. | 3.5 | 10.0. |
| Nature of Alkali-Cellulose Crumb | Soft, fluffy and reactive. | Rather hard in feel. |
| Viscose filtration: Weight in grams filtered through a ¼" diameter disc of Canton flannel before filter plugged. | 142 | 104. |
| Rayon Strength: | | |
| A. Unbleached— | | |
| Grams per denier, dry | 2.26 | 2.18. |
| Percent Elongation, dry | 19.4 | 19.2. |
| Silk factor (gms./den. × percent elong.), dry. | 43.8 | 41.8. |
| B. Bleached— | | |
| Grams per denier, dry | 2.22 | 2.22. |
| Percent Elongation, dry | 19.9 | 19.1. |
| Silk factor (gms./den.×percent elong.), dry. | 44.1 | 42.4. |
| Percent resistance to degradation by heating. | 94.7 | 70.8. |

It will be noted from the above data that markedly great improvements are effected in alkali-cellulose shredding, viscose filtration, and resistance to degradation by heating, while substantial improvements are seen in almost all of the remaining properties tested.

*Example II*

Cellulose treated in the same fashion as in Example I, except that the mixture of primary amines was reacted with 20 mols of ethylene oxide, exhibited improvements similar to those shown for Example I when processed into 150 denier/80 filament viscose rayon textile yarn spinning at 100 metres/min.

*Example III*

A 10% aqueous solution of a product obtained by reacting a mixture of primary amines from animal fat containing approximately 10% hexadecyl amine, 10% octadecyl amine, 35% octadecenyl amine and 45% octadecadienyl amine with 24 mols of ethylene oxide was sprayed across a sheet of cellulose passing through a pulp drying machine at such a rate that 0.1% was added based on the bone dry weight of the cellulose.

The cellulose treated in this fashion exhibited the following improvements in processing into 150 denier/80 filament viscose rayon textile yarn, spinning at 100 metres/minute.

| | Treated Wood Pulp | Untreated Wood Pulp |
|---|---|---|
| Shredding of alkali-cellulose: | | |
| Percent retained on ¼" mesh screen after 1½ hours shredding. | 7.8 | 9.5. |
| Nature of Alkali-Cellulose Crumb | Soft, fluffy and reactive. | Rather hard in feel. |
| Viscose Filtration: Weight in grams filtered through a ¼" diameter disc of Canton flannel before filter plugged. | 124 | 72. |
| Spinning Behavior: | | |
| No. of breaks/spindle in 48 hours | 6 | 8. |
| No. of spinnerets changed in 48 hours | 0 | 3. |
| Spinneret behavior | All O. K. | 1 slow hole. |
| Percent dull ends | 27.9 | 29.7. |
| Rayon Strength: | | |
| A. Unbleached— | | |
| Grams per denier, dry | 2.20 | 2.17. |
| Percent Elongation, dry | 21.0 | 20.8. |
| Silk factor, dry | 46.2 | 45.0. |
| B. Bleached— | | |
| Grams per denier, dry | 2.17 | 2.18. |
| Percent Elongation, dry | 21.0 | 20.5. |
| Silk factor, dry | 45.6 | 44.7. |
| Percent resistance to degradation by heating. | 89.6 | 58.8. |

It will be noted from the above data that even though a different mixture of the primary amines was used and a lesser quantity of the final condensation product was added to the pulp marked improvements are effected in alkali-cellulose shredding, viscose filtration, spinneret changes and resistance to degradation by heating while noticeable improvements are seen in almost all of the remaining properties tested.

*Example IV*

Cellulose was treated in the same fashion as in Example III except that 0.2% of the product based on bone-dry weight of cellulose was added. Essentially the same improvements as shown in Example III were obtained when the cellulose was similarly processed.

*Example V*

Cellulose to which was added 0.1%, based on bone-dry weight of cellulose, of the same product as in Example III was processed into viscose. $TiO_2$ along with emulsifying oils was also added to the viscose which was subsequently spun into 150 denier/80 filament dull yarn at 100 metres/minute.

The emulsion of viscose with $TiO_2$ and oils prepared in this manner was more fine grained and stable than usual.

The following spinning behavior was obtained.

| Spinning Behavior | Treated | Untreated |
|---|---|---|
| No. of breaks/spindle in 48 hours | 3 | 5. |
| No. of jets changed in 48 hours | 2 | 2. |
| Spinneret behavior | 1 slow hole; 2 plugged holes. | 4 slow holes. |
| Percent dull ends (spinning worms) | 24.9 | 37.9. |

Thus the practice of the present invention confers benefits even when dull yarns are produced through the use of pigmented oil emulsions added to the viscose. As will be noted from the above data these benefits are shown by substantial improvement in number of breaks per spindle and per cent dull ends and a noticeable improvement in spinneret behavior.

*Example VI*

Cellulose to which was added only 0.01%, based on bone-dry weight of cellulose, of the same product as in Example I was processed into viscose and the viscose subsequently spun into 150 denier/80 filament viscose rayon textile yarn at 100 metres/minute.

The following improvements were obtained:

| | Treated | Untreated |
|---|---|---|
| Shredding of alkali-cellulose: | | |
| Percent retained on ¼" mesh screen after 1½ hour shredding. | 8.5 | 9.5. |
| Nature of Alkali-Cellulose Crumb | Only slightly fluffier than control. | Rather hard in feel. |
| Viscose Filtration: Weight in grams filtered through a ¼" diameter disc of Canton flannel before filter plugged. | 108 | 98. |
| Spinning Behavior: | | |
| No. of breaks/spindle in 48 hours | 6 | 8. |
| No. of spinnerets changed in 48 hours | 0 | 1. |
| Spinneret Behavior | All O. K. | 2 slow holes. |
| Rayon Strength: | | |
| A. Unbleached— | | |
| Grams per denier, dry | 2.20 | 2.23. |
| Percent Elongation, dry | 20.6 | 19.8. |
| Silk factor, dry | 45.3 | 44.1. |
| B. Bleached— | | |
| Grams per denier, dry | 2.23 | 2.19. |
| Percent Elongation, dry | 21.6 | 20.1 |
| Silk factor, dry | 48.1 | 44.1. |
| Percent resistance to degradation by heating. | 74.8 | 61.1. |

It is obvious that even with this small amount of the product (0.01%) the improvements still are noticeable although not as markedly as in the cases where 0.1% or 0.2% was used.

*Example VII*

An amount of 0.1%, based on bone dry weight of cellulose, of the same product as in Example III was added during the dissolution of xanthate from normal untreated wood pulp. The viscose made was subsequently spun into 150 denier/80 filament textile yarn at 100 metres/minute.

Of course, no improvements were obtained in the processing prior to the addition of the product nor in filtration. However, the following improvements in yarn quality were obtained:

|  | Treated Mixing Solution | Untreated Mixing Solution |
|---|---|---|
| Rayon Strength: |  |  |
| A. Unbleached— |  |  |
| Grams per denier, dry | 2.29 | 2.23 |
| Percent Elongation, dry | 22.3 | 21.8 |
| Silk factor, dry | 51.1 | 48.6 |
| B. Bleached— |  |  |
| Grams per denier, dry | 2.26 | 2.20 |
| Percent Elongation, dry | 22.4 | 21.6 |
| Silk factor, dry | 50.6 | 47.5 |
| Percent resistance to degradation by heating | 89.2 | 45.1 |

Thus marked improvement is effected in resistance to degradation by heating while noticeable improvements are seen in all of the remaining properties tested.

*Example VIII*

Cellulose to which was added 0.1%, based on bone-dry weight of cellulose of the same product as in Example III was processed into viscose which was subsequently spun into 1650 denier 720 filament high strength viscose rayon tire yarn, spinning at 100 metres/minute. The following improvements were obtained.

|  | Treated | Untreated |
|---|---|---|
| Shredding of alkali-cellulose: |  |  |
| Percent retained on ¼″ mesh screen after 1½ hours' shredding | 1.0 | 6.0 |
| Nature of Alkali-Cellulose Crumb | Soft, fluffy and reactive. | Rather hard in feel. |
| Viscose Filtration: |  |  |
| Weight in grams filtered through a ¼″ diameter disc of Canton flannel before filter plugged | 128 | 108. |
| Rayon Strength: |  |  |
| Grams per denier, bone dry | 3.98 | 3.86. |
| Percent Elongation, bone dry | 16.2 | 14.6. |
| Grams per denier, conditioned | 3.57 | 3.46. |
| Percent Elongation, conditioned | 19.2 | 18.8. |
| Grams per denier, wet | 2.10 | 2.07. |
| Percent Elongation, wet | 23.2 | 22.8. |
| Percent resistance to degradation by heating | 97.2 | 61.6. |

Thus marked improvement is effected in alkali-cellulose shredding, viscose filtration and resistance to degradation by heating while noticeable improvements are seen in almost all of the remaining properties tested.

Many variations of this process will suggest themselves to these skilled in the art, but such variations are considered as falling within the scope of this invention, provided the products employed are within the class described.

The products may be added at any stage up to and including the viscose itself, but with diminishing benefits. This will be obvious from our disclosure since addition to the viscose, for example, cannot give improved shredding or any of the other benefits derived in the manufacturing of the viscose. However, addition even to the viscose itself confers the substantial advantages of improved dispersion and stability of pigments and oils, better spinning with fewer breaks, less spinneret incrustation, more first grade yarn, higher rayon strength, and improved resistance of bleached rayon to degradation by heating.

We claim:

1. In the manufacture of regenerated cellulose products from sheeted purified chemical wood pulp by the viscose process, the step of incorporating into said process at a stage subsequent to the formation of the pulp sheets but prior to regeneration of the cellulose from 0.01% to 0.2% of a compound having the general structure

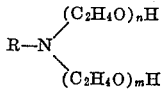

where R represents the alkyl and alkenyl hydrocarbon residue of tallow and the sum of $n+m=10$ to 100.

2. A method for improving the processibility of purified chemical wood pulp into regenerated cellulose products which comprises adding to said chemical pulp from 0.01% to 0.2% based on the bone-dry weight of said pulp of a compound having the general structure

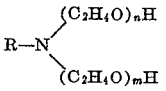

where R represents the alkyl and alkenyl hydrocarbon residue of tallow and the sum of $n+m=10$ to 100.

3. In the manufacture of regenerated cellulose by the viscose process, the step of incorporating into viscose from 0.01% to 0.2% based on the weight of the cellulose content of the viscose of a compound having the general structure

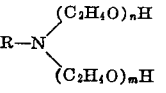

where R represents the alkyl and alkenyl hydrocarbon residue of tallow and the sum of $n+m=10$ to 100.

4. An article of manufacture consisting of a purified chemical wood pulp having incorporated therein from 0.01% to 0.2% based on the bone-dry weight of said pulp of a compound having the general structure

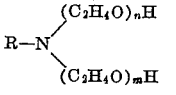

where R represents the alkyl and alkenyl hydrocarbon residue of tallow and the sum of $n+m=10$ to 100.

References Cited in the file of this patent

UNITED STATES PATENTS

| 1,970,578 | Schoeller et al. | Aug. 21, 1934 |
| 2,393,817 | Schlosser et al. | Jan. 29, 1946 |
| 2,432,126 | Schlosser et al. | Dec. 9, 1947 |
| 2,432,127 | Schlosser et al. | Dec. 9, 1947 |
| 2,451,558 | Schlosser | Oct. 19, 1948 |